March 4, 1969 W. KAFKA ET AL 3,431,347
CRYOSTATS FOR LOW-TEMPERATURE CABLES
Filed June 23, 1967

United States Patent Office 3,431,347
Patented Mar. 4, 1969

3,431,347
CRYOSTATS FOR LOW-TEMPERATURE CABLES
Wilhelm Kafka, Tennenlohe, and Claus-Peter Parsch, Nuremberg, Germany, assignors to Siemens Aktiengesellschaft, a corporation of Germany
Filed June 23, 1967, Ser. No. 648,476
Claims priority, application Germany, June 24, 1966, S 104,426
U.S. Cl. 174—15    10 Claims
Int. Cl. H01b 7/34

ABSTRACT OF THE DISCLOSURE

A cryostat for low-temperature cables such as superconductive or cryoconductive cables. The cryostat includes at least one elongated tubular container which houses the cable, and this tubular container has a cable-receiving portion of U-shaped cross section and a cover portion which is connceted to the cable-receiving portion so as to close the latter.

---

Our invention relates to cryostats particularly intended for low-temperature cables such as superconductive or cryoconductive cables.

In particular, our invention relates to a cryostat of this type which includes at least one elongated tubular container for housing such a cable.

When dealing with such low-temperature cables, the thermal insulation is of particular importance, inasmuch as the conductor losses are determined to a decisive extent by the thermal insulation. Up to the present time it has been conventional to use for these purposes tubular containers having between themselves intermediate spaces which are evacuated, such containers housing the cable and being charged with a refrigerating liquid. Inasmuch as vacuum pumps and refrigerating installations for economical reasons can only be situated at relatively great distances, which is to say on the order of distances of at least a kilometer, it is essential with the conventional constructions that the cross section of the evacuated intermediate spaces and the passages for the refrigerating medium be very large, so that such cables can no longer be transported in the form of cable rolls.

It is accordingly a primary object of our invention to provide a cryostat for low-temperature cables of the above type which is composed of easily transportable components which can be assembled at the location where the cable is laid.

In accordance with our invention the cryostat may be composed of one or more tubular containers for housing the cable and each made up of a cable-receiving portion of U-shaped cross section and a cover portion which is connected with the cable-receiving portion.

With this construction of our invention, it is possible to assemble the cable-receiving portions together, these portions having the lengths at which they were transported, and it is also possible in the same way to assemble together the cover portions, in accordance with a method of our invention, and then, according to this method of our invention, the cable is introduced into the innermost cable-receiving portion and the cover portions are connected with the cable-receiving portions. Thus, in the case where there are several containers situated one within the other, it is possible for them to be assembled according to the latter method of our invention.

Preferably the width of the cover portion of each container is less than the space between the side walls of the cable-receiving portion, and the cover portion is provided with a pair of opposed upwardly directed edges which are directly joined to and situated between the side walls of the cable-receiving portion of the container. With this construction of our invention, the connection is simplified inasmuch as it is only necessary to connect together for example by welding, upwardly directed parallel edges.

It is furthermore preferred according to our invention to provide the side edges of the U-shaped cable-receiving portion with a thickness which is less than the thickness of the remainder of the side walls.

With a preferred construction of a cryostat according to our invention, there are several of containers of the above type situated one within the other, and the innermost container houses at least one low-temperature cable. The several containers which are thus situated one within the other define between themselves spaces of annular cross section which are adapted to receive a temperature-influencing means in the form of a thermal insulation or in the form of a refrigerating medium. The low-temperature cable itself may advantageously include an inner supporting tube on or in which superconducting or cryoconducting flexible elements are wound in the manner of a multiple-thread, and the hollow interior of the supporting tube of the cable can serve to accommodate a refrigerating medium so as to form a passage for the latter.

The low-temperature cable, and, if desired, the inner tubular container, can advantageously be hung upon suitable flexible supports in the form of tapes or wires which are of poor thermal conductivity and which extend at an angle with respect to the cable axis.

In order to maintain the vacuum required for thermal insulation and to provide for feeding of the refrigerating medium, the cryostat of our invention is provided along the cable with connecting locations where supply conduits communicate with the containers, each of these conduits including a plurality of pipes concentrically situated one within the other and terminating at the cover portions of the containers in such a way that the innermost pipe communicates with the innermost container and the outermost pipe communicates with the outermost container. When the layout of the cable is such that it rises and falls, the connecting location for the conduits preferably is situated at the highest point of the layout.

Our invention is illustrated by way of example in the accompanying drawings which form part of our application and in which.

Figure 1:
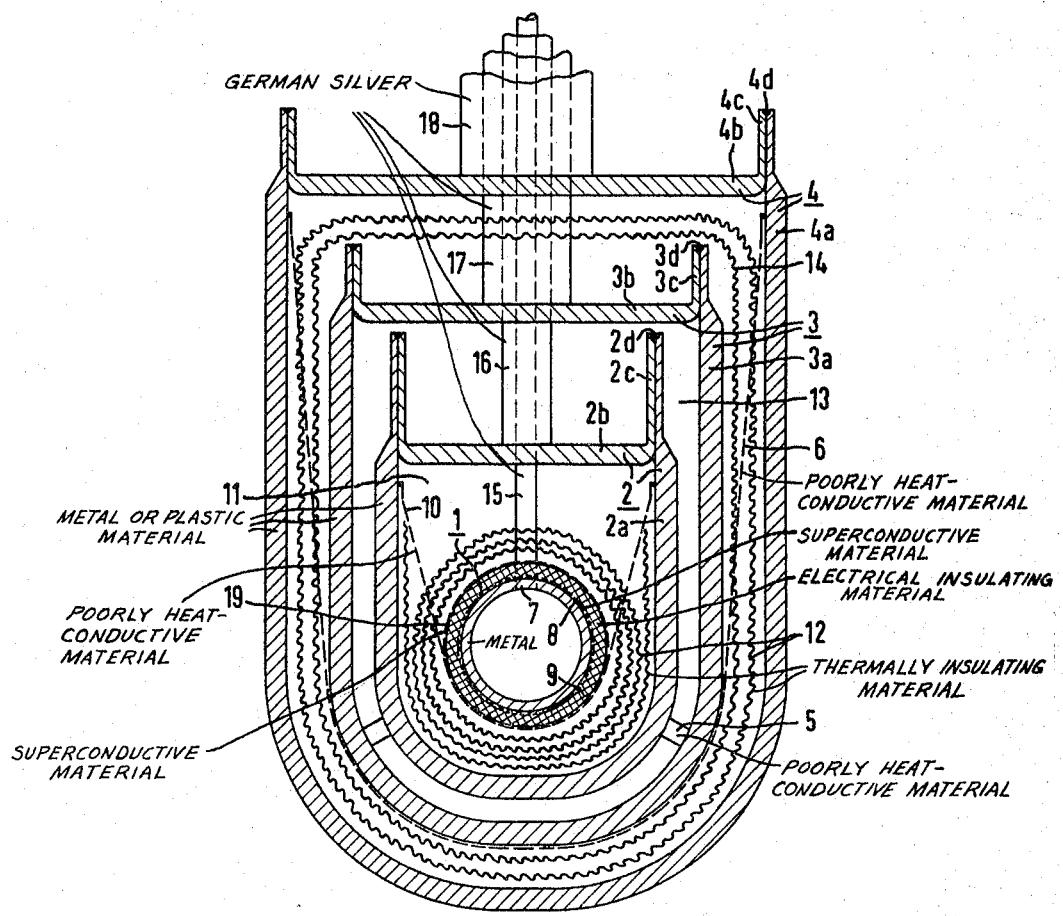
FIG. 1 shows in transverse section one possible embodiment of a cryostat according to our invention.

The cryostat of our invention which is illustrated in FIG. 1 for a low-temperature cable 1 includes three tubular containers 2, 3 and 4 arranged one within the other and maintained separate from each other by spacers 5 and supporting tapes 6. Through such spacers 5 or supporting tapes 6 it is possible to maintain the containers at predetermined locations with respect to each other. The low-temperature cable 1 includes an elongated metallic supporting tube 7 around which a superconductor divided into individual conductors 8 is helically wound and enveloped within an insulating casing 9. The low-temperature cable is supported by a holding tape 10 at its proper location. The intermediate space 11, between the low-temperature cable and the innermost container 2, is evacuated and is in part filled with a known thermal insulation 12 which may be an insulation sold under the trade name "superisolation" formed of crinkled foils of plastic material such as polyethylene terephthalate, particularly, which are coated on one side with a thin reflecting layer of aluminum.

In the intermediate space 13 between the innermost and intermediate container there is a refrigerating medium in the form of liquid nitrogen. The outermost intermediate space 14 between the intermediate and the outermost container is also evacuated and is partly filled with the above thermal insulation 12.

In order to establish and maintain the vacuum, connections are made to vacuum pumps situated at relatively large distances, for example, on the order of a distance of a kilometer from one pump to the next. Refrigerating machines are also provided at these large distances from each other and are connected to the cable assembly through connections descibed below.

The manner in which these connections are made so as to avoid large heat losses is also illustrated in FIG. 1. The conduit means for providing communication with the hollow interior of the low-temperature cable and with the individual tubular containers takes the form of a plurality of concentric pipes 15–18 situated one within the other and spaced from each other, these pipes being connected to the several components in the manner illustrated in FIG. 1. Thus, the innermost pipe 15 communicates with the hollow interior of the tubular cable support 7 through an upper wall portion of the latter, while the several pipes 16–18 terminate at the cover portions of the several containers with the innermost pipe 16 communicating with the interior of the innermost container 2, while the outermost pipe 18 communicates with the outermost container 4. These pipes 15–18 are made of a material of small wall thickness and of poor thermal conductivity, such as, for example, German silver.

As may be seen from FIG. 1, each of the containers is composed of a cable-receiving portion 2a, 3a, 4a, each having a U-shaped cross section, and the several containers include the cover portions 2b, 3b, 4b which are respectively connected with the cable-receiving portions 2a, 3a, 4a. The width of the several cover portions is less than the space between the side walls of the cable-receiving portions, and the cover portions are provided with upwardly directed side edges 2c, 3c, 4c. The side walls of the respective cable-receiving portions of the containers are connected with these upwardly directed side edges. In the illustrated example there are welded connections 2d, 3d, 4d, providing the connections between the cover portions and cable-receiving portions of the several containers.

Inasmuch as the assembly of the containers takes place at the location where the cable is laid and where the low-temperature cable is already situated within the cryostat, the thickness of the side walls of the cable-receiving portions at the elevations of the side edges of the cover portions is reduced. In this way an intense heating of the container walls during welding is avoided. If desired, the cover portions can be upwardly bulged between their upwardly directed side edges, so that without large space requirements it is possible to increase the free pump cross section.

In order to compensate for thermal expansion and contraction of the refrigerated containers, the latter can either be laid along slightly wavy lines or they can be provided with a wavy or corrugated configuration along their entire length or at predetermined portions for predetermined lengths, in which case the cover also is provided with a correspondingly wavy configuration. The expansion and contraction of the cable itself can be taken care of by laying the cable also along a slightly wavy line within the innermost container.

Figure 3:
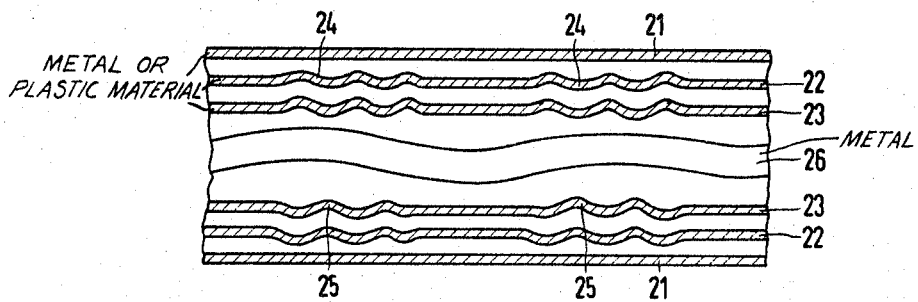
FIG. 3 is a fragmentary longitudinal section schematically illustrating the construction of our cryostat which enables the latter to compensate for changes in length resulting from thermal expansion and contraction.

Thus, referring to FIG. 3, it will be seen that the cryostat which is shown in a sectional plan view from above includes the outer container 21, an intermediate container 22, and an innermost container 23. The containers 22 and 23 are provided with a wavy corrugated configuration at the locations 24 and 25. The cable 26 itself is laid in a slightly wavy configuration in the interior container 23. The supporting tapes which support the containers and cable can have the construction shown in FIG. 1. For the sake of clarity they are not illustrated in FIG. 3.

Figure 4:
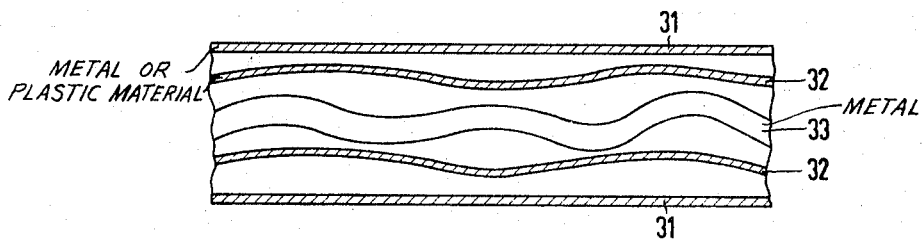
FIG. 4 is a fragmentary longitudinal sectional view illustrating another embodiment of a construction which will compensate for length changes resulting from changes in temperature.

As may be seen from FIG. 4, which schematically illustrates a cryostat of our invention as seen from above in a sectional plan view, this cryostat has an outer container 31 and an inner container 32 arranged along a slightly wavy line. The cable 33 is also laid in a slightly wavy configuration. The supporting tapes again are not shown in FIG. 4 for the sake of clarity.

Figure 2:
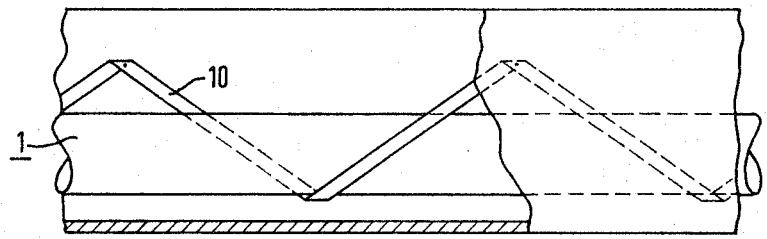
FIG. 2 is a schematic fragmentary side view illustrating the manner in which a cable is supported in a container, according to our invention.

As may be seen from FIG. 2, the supporting of the low-temperature cable 1 within the innermost container 2 is brought about by way of an elongated flexible supporting structure 10 having the form of a suitable tape, for example, which extends in a direction which is inclined to the cable axis. As a result the distance between the locations which have potentially different temperatures is increased and thus the thermal resistance is increased. These supporting tapes can be made of a material of poor thermal conductivity, such as, for example, an alloy of poor thermal conductivity or nylon.

Figure 5:
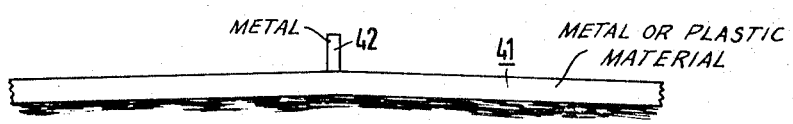
FIG. 5 is a schematic representation of the manner in which supply conduit assemblies are connected with the cable structure.

As has already been pointed out above, it is possible with the cryostat of our invention to assemble the structure at the place where the cable is laid. The cable-receiving portions of the tubular containers are supplied to the location where the cable is laid in lengths convenient for transporting purposes, and they are laid either in or over the cable trench where they are welded or otherwise joined in a vacuum-tight manner. Then, according to the method of our invention which includes the initial step of handling only the cable-receiving portions, as pointed out above, the low-temperature cable is laid into the innermost cable-receiving portion, and finally, according to the method of our invention, the cover portions are welded or otherwise joined to the cable-receiving portions in a vacuum-tight manner. In the case where the cable has a rising and falling layout, the connection of the supply conduits thereto preferably takes place at the highest point of the layout. Thus, referring to FIG. 5, there is schematically shown therein a cable layout which rises and falls, and the connecting location 42 for the conduit means, such as the conduit means 15–18 referred to above and shown in FIG. 1, is situated at the highest point of the layout, as illustrated in FIG. 5.

The above-described cable construction and method of cable laying according to our invention can be used also for superconductive or cryconductive communication cables. In this case bundles, which may be twisted, for example, of pairs of conductors composed of lead, niobium, niobium-zirconium, etc., with their insulating sheaths made, for example, of polyethylene are inserted through or wound within a tube having helium or a refrigerating gas in its interior, or the conductors may be guided along or wound about the exterior of such a tube. It is also of advantage to situate both power and communication cables in a single cryostat. In this event the interior of the container 2 can accommodate one or more bundles 19 of conductor pairs made of niobium, niobium-zirconium or lead wire of 0.1 mm. diameter, or of nylon fibers provided with a covering of lead, or ultrapure aluminum having a wire thickness on the order of 0.1–0.4 mm., so that any conductors of this latter type can also be accommodated within the cryostat.

As contrasted with normal communication cables which operate at room temperature, there are achieved with the structure of our invention very small ohmic resistances, a low transmission loss, a low capacitance, and a low cross-talk coupling.

Furthermore, the cost is less than with a self-sustaining communication cable.

In the event that it is desired to situate in the same cryostat which accommodates a communication cable a power cable for alternating current, then a suitable construction will have the power cable in the form of a coaxial cable for the supply and return conductors. The same applies to direct current cable having signals which to a large extent are of high harmonic content.

We claim:

1. In a cryostat for superconductive or cryoconductive cables, a plurality of elongated tubular containers for housing the cable, said containers having a cable-receiving portion of U-shaped cross section and a cover portion connected with and closing said cable-receiving portion, said container being arranged one within and spaced from the other, and including an innermost container housing at least one low-temperature cable and said containers defining between themselves spaces of annular cross section, and temperature-influencing means situated in said spaces.

2. The combination of claim 1 and wherein said temperature-influencing means in at least one of said spaces is in the form of a thermal insulation.

3. The combination of claim 1 and wherein said temperature-influencing means in at least one of said spaces is in the form of a refrigerating medium.

4. The combination of claim 1 and wherein said low-temperature cable which is situated in said innermost container includes an inner supporting tube carrying elongated flexible conductors having a multiple-thread winding and accommodating in its interior a refrigerating medium so that the interior of said tube forms a passage for the refrigerating medium.

5. The combination of claim 1 and wherein a conduit means communicates with the interiors of the several containers at predetermined locations therealong, said conduit means at each of said locations including a plurality of concentric pipes situated one within and spaced from the other with the innermost pipe communicating with the innermost container and the outermost pipe communicating with the outermost container, and said pipes respectively terminating at said cover portions of said containers.

6. The combination of claim 5 and wherein said cable and the containers have a layout which rises and falls, and said conduit means being connected to said containers at the highest points of said layout.

7. The combination of claim 1 and wherein said cable is of a slightly wavy configuration to compensate for changes in length and wherein the inner containers also have a slightly wavy longitudinal configuration within the outer container.

8. In a cryostat for superconductive or cryoconductive cables, at least one elongated tubular container for housing the cable, said container having a cable-receiving portion of U-shaped cross section and a cover portion connected with and closing said cable-receiving portion, and an elongated flexible support situated in said container for supporting a cable therein, said elongated flexible support extending at an angle with respect to the axis of the cable and being made of a material of poor thermal conductivity.

9. In a cryostat for superconductive or cryoconductive cables, at least one elongated tubular container for housing the cable, said container having a cable-receiving portion of U-shaped cross section and a cover portion connected with and closing said cable-receiving portion, said container being of a longitudinal wavy configuration at at least some locations to compensate for changes in length of the container.

10. In a cryostat for superconductive or cryoconductive cables, at least one elongated tubular container for housing the cable, said container having a cable-receiving portion of U-shaped cross section and a cover portion connected with and closing said cable-receiving portion, said container accommodating in its interior both a power cable and a communication cable.

References Cited

UNITED STATES PATENTS

| | | | |
|---|---|---|---|
| 442,162 | 12/1890 | Young | 174—98 |
| 2,777,009 | 1/1957 | Whitman | 174—15 |

LEWIS H. MYERS, *Primary Examiner.*

A. T. GRIMLEY, *Assistant Examiners.*

U.S. Cl. X.R.

62—65.5; 174—13, 37; 333—99